United States Patent [19]
Bradford

[11] 4,266,576
[45] May 12, 1981

[54] FLOW CONTROL DEVICE IN A PROTECTIVE HOUSING

[75] Inventor: Jay H. Bradford, South Elgin, Ill.

[73] Assignee: Eaton Corporation, Cleveland, Ohio

[21] Appl. No.: 969,649

[22] Filed: Dec. 13, 1978

Related U.S. Application Data

[63] Continuation of Ser. No. 855,848, Nov. 30, 1977, abandoned.

[51] Int. Cl.³ ............................................. F15D 1/02
[52] U.S. Cl. ...................................... 138/40; 138/41; 138/42; 138/45; 138/46; 285/256; 285/423; 239/533.13
[58] Field of Search .................. 138/40, 42, 44, 45, 138/46, 41; 285/256, 382, 423; 239/533.13

[56] References Cited

U.S. PATENT DOCUMENTS

| | | | |
|---|---|---|---|
| 2,454,929 | 11/1948 | Kempton | 138/45 |
| 2,545,789 | 3/1951 | Miller | 138/43 X |
| 2,645,099 | 7/1953 | Cumming | 138/41 X |
| 2,772,833 | 12/1956 | Chace | 138/45 X |
| 2,836,199 | 5/1958 | Wilson | 138/45 |
| 2,891,578 | 6/1959 | Dahl et al. | 138/45 |
| 2,936,788 | 5/1960 | Dahl et al. | 138/45 |
| 3,077,903 | 2/1963 | Honsinger | 138/45 |
| 3,109,459 | 11/1963 | Lee et al. | 138/41 |
| 3,396,848 | 8/1968 | Kozel | 138/41 X |
| 3,444,897 | 5/1969 | Erickson | 138/45 |
| 3,630,444 | 12/1971 | Nelson | 138/46 X |
| 3,733,180 | 5/1973 | Heinreck et al. | 138/45 X |
| 3,792,609 | 2/1974 | Blair et al. | 138/41 X |
| 3,997,195 | 12/1975 | Bartholomew | 285/423 X |
| 4,009,592 | 3/1977 | Boerger | 138/45 X |

FOREIGN PATENT DOCUMENTS

372286  4/1932  Switzerland .............................. 138/45

*Primary Examiner*—James E. Bryant, III
*Attorney, Agent, or Firm*—R. J. McCloskey; R. A. Johnston; E. C. Crist

[57] ABSTRACT

A flow control device having a resilient, disc-shaped flow control element mounted in a protective housing assembly. An inlet housing section sealingly engages with an outlet section to form a cavity in which are received a retaining washer and a cup-shaped member. The flow control element is mounted in the cup-shaped member and retained therein against axial movement by the retaining washer. An inner wall portion on the retaining washer and cup-shaped member prevent fluid conduit connections inserted into either the inlet or outlet housing sections from contacting the flow control member.

3 Claims, 2 Drawing Figures

FLOW CONTROL DEVICE IN A PROTECTIVE HOUSING

This is a continuation of application Ser. No. 855,848, filed Nov. 30, 1977, now abandoned.

BACKGROUND OF THE INVENTION

The invention relates to flow control devices which are connected to inlet and outlet fluid supply conduits of the type typically used in irrigation systems. Installation of the flow control devices is generally done in the field where special tools and fixtures are not available for precise positioning of the conduit in the device and under conditions which require that the connections to the flow control device be made in a minimal amount of time.

A problem that has arisen during assembly of the supply conduits to flow control devices is that the conduit often extends too far into the device and contacts the resilient flow control member thereby interfering with the flexing and operation of the resilient flow washer.

A further problem encountered with irrigation and related type applications has been the occurrence of clogging of the fluid conduit lines which has required costly maintenance procedures and has resulted in breakdown of the irrigation line downstream from the flow control device.

SUMMARY OF THE INVENTION

In the present invention the difficulties encountered during installation of flow control devices in irrigation and other related systems have been overcome by providing a flow control device with a unique protective housing arrangement which prevents the connective conduit from damaging or interfering with the functioning of the flow control member while at the same time permitting fluid flow therethrough in an unimpeded manner.

In a unique aspect, the invention incorporates a tubular filtering element mounted in the inlet portion of the flow control device and having a protective stop which limits the position of the fluid conduit in the device. The filtering element also presents a relatively large flow area to the incoming stream of fluid and, thus, has the capacity for filtering a large amount of debris without clogging or interfering with fluid flow into the flow control element.

DETAILED DESCRIPTION

Figure 1:
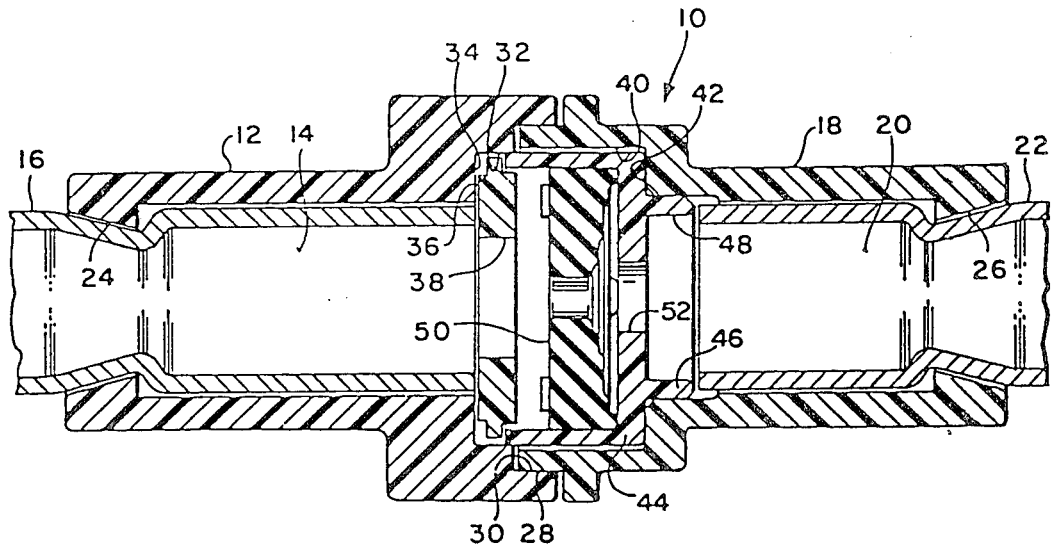
FIG. 1 is a cross-sectional view of the invention.

Referring now to FIG. 1, a flow control device is indicated generally by reference numeral 10. An inlet housing section 12 defines a fluid passageway 14 in which is received an inlet fluid conduit 16. An outlet housing section 18 defines a fluid passageway 20 in which is received an outlet fluid conduit 22. Both the inlet and outlet housing sections have annular, inwardly tapering surfaces 24 and 26, respectively, which tend to crimp and sealingly engage with the fluid conduits. The inlet and outlet fluid conduits, which form no part of this invention, are formed of a material which will conform to and take a permanent set against the tapered sealing surfaces 24 and 26. With reference to FIG. 1, a tapered registering diameter 28 is located on the left end of outlet housing section 18 and mates with a corresponding tapered counterbore 30 located on the right end of inlet housing section 12. A counterbore 32 and shoulder 34 are formed in the right end of inlet housing section 12. A retaining washer 36 is received in counterbore 32 and seats against shoulder 34. An internal diameter 38 is centrally located in retaining washer 36 and is sized less than the internal diameter of inlet fluid conduit 16. A counterbore 40 and shoulder 42 are formed in the left end of outlet housing section 18. A cup-shaped member 44 is received in counterbore 40 and seats against shoulder 42 and has an axially extending tubular portion 46 located on the right end thereof. Tubular portion 46 has an internal diameter 48 sized to prevent the end of the outlet fluid conduit from extending further into the flow control device. The retaining washer 36 and the cup-shaped member 44 are sized to span the distance between shoulder 34 and shoulder 42. A resilient flow control member 50 of the flow restrictive type well known in the art is mounted in the cavity defined by the retaining washer and the cup-shaped member 44. A centrally located orifice 52 is formed in cup-shaped member 44 and permits fluid to exhaust therethrough. The device is assembled by inserting the retaining washer into the inlet housing, inserting the cup-shaped member into the outlet housing with the resilient control member inserted therein, and then sonically welding the inlet housing and outlet housing sections at the junction of registering diameter 28 and counterbore 30. In the preferred practice of the invention the inlet housing section, retaining washer, cup-shaped member, and outlet housing section are all formed from a suitable plastic material compatible with the sonic welding process. The resilient flow control member 50 is generally formed of an elastomeric material.

Field installation of the flow control device as described above is accomplished by inserting the inlet fluid conduit into the inlet housing section to a depth sufficient to abut against the retaining washer 36. In a similar fashion the outlet fluid conduit is inserted into the outlet housing section to a depth sufficient to abut against the end of tubular projection 46. The unique features of the protective housing arrangement surrounding the resilient flow control member permit fluid conduit to be quickly installed without the need for special tools or fixtures and without having the fluid conduit impinge upon or damage the resilient flow control member or interfere with the path of fluid flow therethrough.

Figure 2:
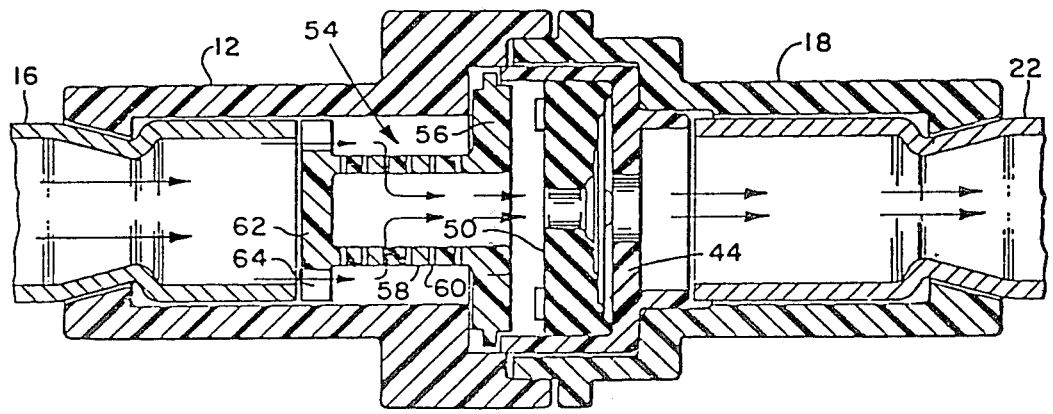
FIG. 2 is a cross-sectional view of a second embodiment of the invention.

Referring now to FIG. 2, there is shown a second embodiment of the invention which further includes a filter element indicated generally by reference numeral 54. The filter element includes a retaining washer section 56, a cylindrical filter section 58 containing a plurality of radially disposed orifices, one of which is indicated by reference numeral 60, and a wall portion 62 located on the left end thereof. A plurality of flow openings, one of which is indicated by reference numeral 64 is circumferentially spaced around the periphery of wall portion 62. The flow opening 64 extends inward radially an amont sufficient to clear the internal diameter of the inlet fluid conduit, thereby permitting fluid flow to pass from the conduit through the fluid openings. The remaining elements of the second embodiment of the invention are identical in configuration and function to those of FIG. 1.

In operation fluid flow follows a path indicated generally by the black arrows in FIG. 2. Flow enters the inlet housing section passageway by means of the inlet conduit and passes through fluid opening 64 and then into the space between wall 62 and retainer 56. Downstream line pressure then forces the fluid through the filtering orifices 58 where it then flows against the resilient flow control member. The operation and effect of the resilient flow control member is well known to those skilled in the art and its effect upon fluid flow will not be described.

Upon exiting through the fluid control member, the reguated flow continues on a path through the outlet housing section and finally exhausts through the outlet fluid conduit. It should be emphasized that the effective filtration area provided by the cylindrical filtering element is substantially larger than the effective area through the centrally located metering orifice in the resilient flow control member and, as such, is able to filter a large amount of debris from the main stream of fluid flow before it is necessary to service the filter. With respect to the second embodiment of the invention, the inlet housing section can be joined and fluidly sealed with respect to the outlet housing section in a manner that permits disassembly in order to clean the filter element. Alternate methods that might be used include a threaded engagement or a clamping device which would tend to pull the inlet housing toward the outlet housing.

The embodiments of the invention as shown and described above are representative of the inventive principles as stated herein. It is to be understood that variations and departures can be made from the embodiments as shown without, however, departing from the scope of the appended claims.

I claim:

1. A flow control device adapted for connection between an inlet and outlet fluid conduit comprising:
   (a) an inlet housing section defining a first fluid passage therethrough, said first fluid passage sized to receive said inlet fluid conduit therein;
   (b) an outlet housing section defining a second fluid passage therethrough, said second fluid passage sized to receive said outlet fluid conduit therein, said outlet and said inlet housing sections cooperating to define a fluid chamber intermediate the ends thereof;
   (c) an annular retainer member received in said cavity and having a centrally located first orifice therein, said first orifice having an internal diameter less than the internal diameter of said inlet fluid conduit to prevent said inlet fluid conduit from passing therethrough;
   (d) a cup-shaped member received in said cavity and disposed adjacent and coaxially aligned with said retainer member, said cup-shaped member having an open end portion and a closed end portion, said closed end portion having a centrally located fluid flow orifice therethrough, said cup-shaped member including a tubular portion extending axially from said closed end portion, said tubular section having an outer wall surface portion in registration with an adjacent internal surface portion of said cavity for limiting movement with respect thereto, said tubular section having a transverse internal dimension less than the external diameter of said outlet fluid conduit for preventing said outlet conduit from passing therethrough, said retainer member and said cup-shaped member further defining a fluid cavity; and
   (e) a resilient flow control member disposed in said fluid chamber, said flow control member having an annular configuration with an orifice therethrough, said control member flexing under pressure variations to maintain a constant flow under a wide range of fluid pressures, said retainer member and said cup-shaped member isolating and protecting said control member from impingement by said inlet and outlet fluid conduit as inserted into said inlet and outlet housing sections, said tubular section further preventing said outlet fluid conduit from interferring with the flow of fluid through said fluid flow orifice in said cup-shaped member.

2. The device as defined in claim 1, further including
   (a) tubular shaped filter element located upstream from said retainer member and disposed in said first fluid passage, said filter element containing a plurality of radially disposed filtration orifices, said filter element having its downstream end in fluid sealing engagement with said retainer member; and
   (b) a wall member disposed upstream of said filter element and disposed in said first fluid passage, said wall member in fluid sealing engagement with the upstream end of said filter element, said wall member defining at least one peripheral flow passage between the surface of said first fluid passage and the periphery of said wall member, said peripheral flow passage extending inward radially an amount sufficient to permit fluid exhausting from said inlet fluid conduit to pass therethrough, said fluid contained between said retainer member and said wall member flowing inward radially to said filter element, said fluid flow continuing through said resilient flow control member.

3. The device as defined in claim 1, wherein said inlet and outlet housing sections each include a retaining means for axially securing fluid conduit received through said first and second fluid passages respectively, said retaining means being formed on the inner periphery of each of said first and second fluid passageways and comprising radially inward tapered surface portions for sealingly engaging fluid conduit.

* * * * *